Sept. 24, 1929.  A. N. ANDERSON  1,729,320

INSTRUMENT FOR MEASURING ELECTRIC CURRENTS

Filed Sept. 2, 1927

INVENTOR
Arthur N. Anderson
by Byrnes, Stebbins & Parmelee
his attorneys

Patented Sept. 24, 1929

1,729,320

UNITED STATES PATENT OFFICE

ARTHUR N. ANDERSON, OF CRAFTON, PENNSYLVANIA

INSTRUMENT FOR MEASURING ELECTRIC CURRENTS

Application filed September 2, 1927. Serial No. 217,283.

This invention relates to the measuring of electrical currents, in volts, amperes or watts, and relates more especially to devices of this kind, commonly referred to as Kelvin balances.

In balances of this type as heretofore constructed there has usually been provided a balanced beam which is influenced by the current being measured to close one of two circuits to energize an actuating means for a second beam. The second beam has heretofore been connected with the first beam by means of a spring. When the pull of the spring equals the magnetic pull of the current being measured to restore the balance of the first beam the correct current value is ascertained by a pointer actuated through the movement of the second beam.

The use of a spring in a device of this kind is very unsatisfactory for the reason that the characteristics of the spring are not constant, and the spring is affected by temperature and atmospheric conditions. This necessitates frequent adjustment of the spring and testing of the instrument, as any inaccuracy of the spring will throw the instrument out of proper calibration.

The present invention has for its principal object to provide an instrument of this type wherein springs are entirely eliminated and to provide a flexible weight for counterbalancing the balanced lever, and to provide means for variably actuating the weight to restore the proper balance for the beam to accurately indicate the value of the current being measured.

The invention has for a further object to provide a weight which is extremely flexible and which is not affected by atmospheric or temperature conditions, so that its effect, once the instrument has been calibrated, will be unvarying and repeated adjustment at short intervals will not be required.

The nature of the invention may be readily understood by reference to the accompanying drawings which illustrate diagrammatic embodiments of the invention and to the details of which the invention is obviously not restricted.

Figure 1:
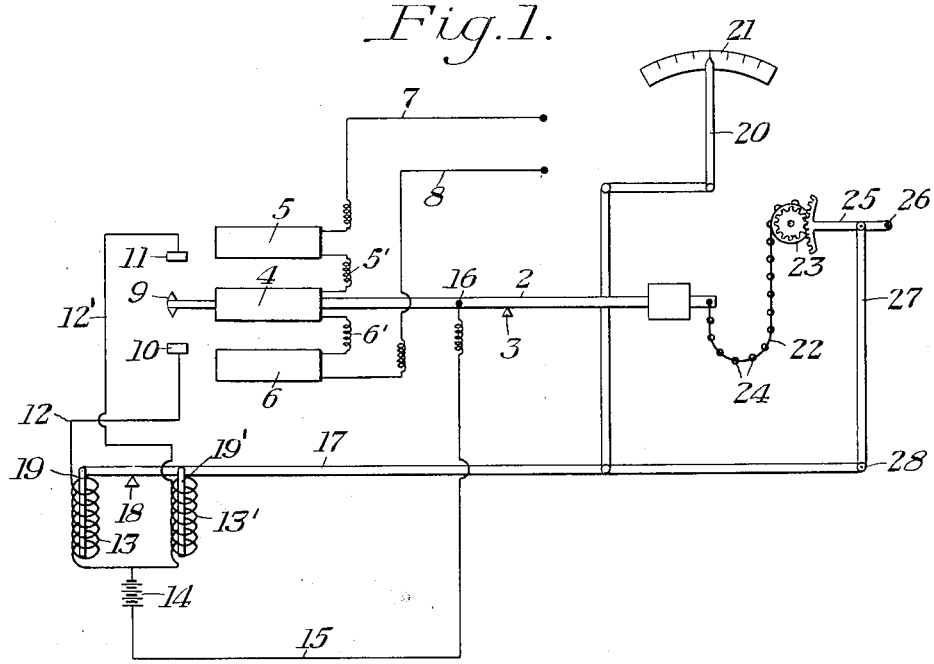
Figure 1 is a diagrammatic view of one form of Kelvin balance having my invention applied thereto.

Referring first to the embodiment shown in Figure 1, 2 designates a beam which is normally balanced on a fulcrum 3. On at least one end of the beam 2 there is a winding 4. Spaced above the winding 4 and stationary with respect thereto is another winding or coil 5, and below the winding 4 and stationary with respect thereto is a similar coil 6. The coils 4, 5 and 6 constitute magnets which attract or repel each other. The several windings are connected in series, the coils 4 and 5 being connected by a flexible conductor 5' and the windings 4 and 6 being connected by a similar flexible conductor 6". One side of the coil 5 is connected by a wire 7, which is adapted to be included in a circuit to be tested. One side of the coil 6 is connected with a wire 8, which is adapted to be included in the other side of the circuit to be tested. When a current flows through the wires 7 and 8, the floating magnet 4 on the beam 2 is attracted by the coil 6 and repelled by the coil 5.

On the end of the beam 2 is a contact member 9 adapted to make contact with one or the other of fixed contacts 10 and 11. When the beam is moved down by the action of the several magnets, against the action of the counterbalance hereinafter mentioned, the contact 9 closes a circuit with fixed contact 10, and when the counterweight exerts an overbalancing effect, the contact 9 closes a circuit with contact 11. The contact 10 is in circuit with a wire 12 leading to a solenoid 13 whose other side is connected through a battery 14 and wire 15 with the beam, as indicated at 16, to make the return circuit to contact 9. The contact 11 is in circuit with solenoid 13', battery 14 and wire 15.

At 17 is a lever supported on a fulcrum at 18. Connected to the lever 17 on one side of the fulcrum 18 is an armature 19 for the solenoid 13 and connected to the lever 17 at the other side of the fulcrum is an armature 19' for the solenoid 13'.

Connected to the lever 17 through a system of levers is a pointer 20 adapted to move back and forth over the scale 21 according to the movement of the lever 17.

Connected to the end of the balanced beam 2, opposite the contact 9, is a flexible string or cord, which is preferably of such a nature that it will not absorb moisture to any considerable extent and which is not materially affected by weather conditions or by variations in atmospheric temperature. This string, designated 22 has its other end wound about a drum 23, and secured to the string at intervals along its length are a plurality of small weights 24. The beads or weights 24 may be of any suitable material, but are preferably of a non-magnetic material and are preferably made of glass inasmuch as this material will not absorb moisture or be affected by atmospheric conditions. The drum 23 is rotatable on a fixed support not shown, and is rotated through a segmental rack on an arm 25 whose outer end is pivotally connected at 26 with a link 27 pivotally connected to the end of the lever 17 at 28.

In the operation of the device, wires 7 and 8 are connected to a circuit to be tested, whereupon the magnet 4 will be attracted to the magnet 6, thereby closing the circuit between contacts 9 and 10, to energize solenoid 13. The energization of the solenoid 13 will attract the armature 19 down, pulling down on the lever 17 to move the link 27 up, rocking the arm 25 up, thereby rotating the drum 23 to increase the length of the flexible weight 22. As the weight 22 is lengthened, the counterbalancing effect thereof is increased, tending to equalize the magnetic force that rocks the beam. When a condition of balance between the counterweight 22 and the lever 2 exists, the current value will be indicated by the pointer 20, which will have been moved by the movement of lever 17 over the scale 21.

If the counterbalance is overbalancing the magnetic attraction, the coil carrying end of the lever 2 will rise, to close a circuit to solenoid 13', thereby moving lever 17 in the other direction, to decrease the effective length of the counterweight.

It will be seen that the arrangement shown in Figure 1 is merely diagrammatic, and that such mechanical features may be incorporated therein as will insure the proper ratio of movement of the drum 23 for any given movement of the arm 17.

Figure 2:
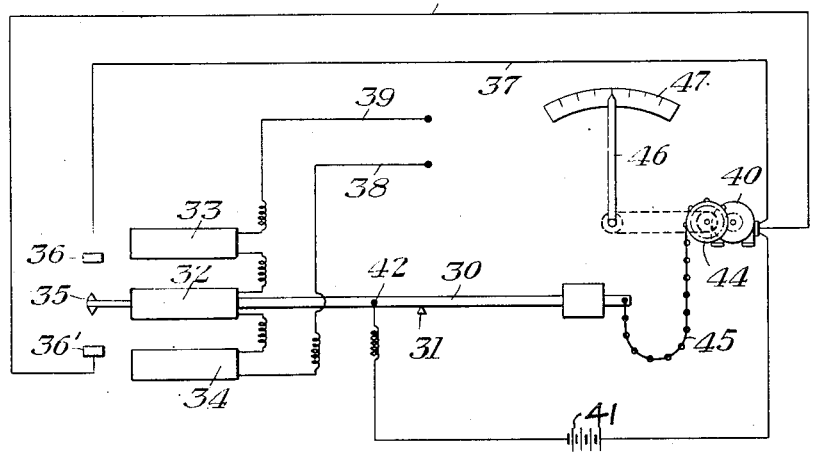
Figure 2 is a similar view of a slightly modified arrangement.

The arrangement shown in Figure 2 is a more practical embodiment of the invention. In this figure, 30 designates the balanced beam, corresponding to the beam 2 of Figure 1, 31 is the fulcrum, 32 is the coil at one end of the beam, 33 is the fixed coil above the magnet 32 and 34 is the fixed magnet below the magnet 32. At the end of the beam 30 is the contact 35 for engagement with the upper contact member 36 or the lower contact member 36' according to the movement of the beam. The coils 32, 33 and 34 are connected in series across wires 38 and 39 to which the circuit to be tested is connected. Contact 36 is in circuit with a wire 37 leading to a reversible motor 40. The other side of the motor 40 is connected through a battery or other source of current 41 to the beam 30 at point 42 and through the beam is connected to the contact 35. The contact 36' connects through another wire 43 with the reversible motor 40. The circuit through contact 36 is arranged to drive the motor 40 in one direction while the circuit through contact 36' drives the motor 40 in the opposite direction. The motor 40 drives the drum 44 corresponding to drum 23 of Figure 1. Wound about this drum is one end of the flexible weight 45, which is comprised of a cord with weights distributed therealong, as described in connection with Figure 1, and the other end of this flexible weight is connected to one end of the beam 30.

The drum 44 is geared through a sprocket or in any other suitable manner with a pointer 46 movable along the scale 47.

In the operation of the arrangement herein shown the circuit to the motor 40 will be closed when the coil 32 is attracted toward the coil 34, and the motor 40 will be driven in a direction to unwind the flexible weight 45 until a balance has been reached. As the drum is rotated by the motor to unwind the weight to increase its effective length, the indicator 46 is correspondingly moved with respect to the scale 47, and the value of the current to be measured is thus indicated. If the counterweight is too heavy, the contact 35 is moved into contact with the contact element 36 and the motor 40 is driven in the opposite direction to decrease the effective length of the counterweight 45.

While the general type of instrument herein described is admittedly old, my invention consists in the provision of a variable counterweight whose effective length is increased or decreased according to the movement of the balanced beam, whereby springs heretofore provided in devices of this nature can be eliminated. The weight amployed is of an extremely flexible nature, so that very fine increments of measurement are obtainable and the device is immune to changes of temperature and atmospheric conditions in so far as the variable counterweight is concerned. A further advantage of the invention resides in the provision of means for automatically varying the effective length of the counterweight to counterbalance the magnetic attraction to restore the balanced beam to a neutral position, and thereby accurately indicate the value of the current to be measured.

While I have illustrated two embodiments of my invention, it will be understood that the invention is not confined to the particular arrangement of parts therein disclosed, and that it may be otherwise embodied within the spirit of my invention and under the scope of the appended claims.

I claim:

1. In an apparatus of the class described, a lever, an electromagnetic means for moving the lever out of normal position, a flexible counterweight attached to the lever including a flexible element having weights distributed therealong, and means for varying the effective length of said variable counterweight, said means including an electrically responsive element controlled by the movement of said lever.

2. In an apparatus of the class described, a lever, electromagnetic means for moving the lever out of a normal position, a flexible counterbalance for returning the lever to normal position and electrically operated means controlled by the movement of said lever for effectively lengthening or shortening the counterbalance.

3. In an apparatus of the class described, a balanced lever, electromagnetic means for moving the lever in one direction out of a normal balanced position, a variable counterweight associated with the lever for counteracting the influence of said electromagnetic means, and means controlled by the lever for operating the variable counterbalance.

4. In an apparatus of the class described, a balanced lever, electromagnetic means for moving the lever in either direction out of neutral position, a flexible counterweight attached to the lever, a drum over which the counterweight is wound, and means responsive to the movement of the lever for rotating the drum to vary the effective length of the flexible counterbalance whereby the influence of said electromagnetic means may be counteracted, and an indicator movable synchronously with the drum.

5. In an apparatus of the class described, a pivoted lever, electromagnetic means for moving the lever out of normal position, a counterweight for restoring the lever to normal position against the influence of said electromagnetic means, a contact element on the end of the lever, a fixed contact with which the first mentioned contact makes circuit when the lever is out of normal position, and electric means in circuit with said contacts for operating the variable counterbalance, whereby the lever may be automatically returned to normal position against the influence of said electromagnetic means.

6. In an apparatus of the class described, a pivoted lever, electromagnetic means for moving the lever out of normal position, a counterweight for restoring the lever to normal position against the influence of said electromagnetic means, a contact element on the end of the lever, a fixed contact with which the first mentioned contact makes circuit when the lever is out of normal position, and electric means in circuit with said contacts for operating the variable counterbalance, whereby the lever may be automatically returned to normal position against the influence of said electromagnetic means, and an indicator operatively connected with said counterweight operating means.

7. In an apparatus of the class described, a balanced lever, electromagnetic means for rocking the lever, and a counterweight attached to the lever including a flexible cord having weights distributed therealong.

8. In an apparatus of the class described, a balanced beam, electromagnetic means for rocking the beam, a contact movable with the beam, fixed contact members with which the first mentioned contact member may engage when the lever is rocked to either limit of its movement, a flexible counterweight associated with the lever for counteracting the attraction of said electromagnetic means, electric means for operating the flexible counterweight, one of said fixed contacts being in a circuit with said electric operating means in such manner as to cause said operating means to increase the effective length of said flexible counterweight when contact is made therewith, the other fixed contact being in circuit with said electric operating means to cause the effective length of the flexible counterweight to be decreased when the circuit thereto is closed.

9. In an apparatus of the class described, a balance beam movable in opposite directions from a normal position between certain limits, electromagnetic means for moving the beam in one direction out of its normal balanced position, circuit closing means associated with the lever for closing independent circuits when the lever is at either limit of its movement, a variable counterweight connected with the lever, a reversible actuating means for the counterweight, said contact closing means being in circuit with said reversible actuating means for effecting operation thereof in reverse directions respectively.

10. A measuring means for electric currents including a balanced beam, electromagnetic means for actuating the beam out of its normal balanced position, contacts closed by the predetermined movement of the beam in either direction from its normal position, a flexible counterweight connected with the beam, reversible means for varying the effective length of said flexible counterweight, one of said contacts being arranged for effecting the movement of said reversible actuating means in one direction when the circuit thereto is closed and the other of said contacts being arranged to effect the operation of the reversible actuating means in the opposite direction when contact is made therewith, and an indicator operated through the movement of said reversible actuating means.

11. The combination with a measuring device of the Kelvin balance type having a balance beam therein, of a variable counterweight of a flexible nature attached thereto, and means for varying the effective length of said counterweight.

12. The combination with an electric current measuring device of the Kelvin balance type wherein a balance lever is employed, of a flexible element having one end connected to the beam, the other end of said element being connected to a reversible operating means, circuits for reversely operating the said operating means upon a predetermined movement of said beam in reverse directions from a neutral position, and an indicator actuated by said reversible operating means.

In testimony whereof I have hereunto set my hand.

ARTHUR N. ANDERSON.